United States Patent
Yang et al.

(10) Patent No.: US 12,179,726 B2
(45) Date of Patent: Dec. 31, 2024

(54) VEHICLE CONTROL APPARATUS AND METHOD

(71) Applicants: HYUNDAI MOTOR COMPANY, Seoul (KR); Kia Corporation, Seoul (KR)

(72) Inventors: Junho Yang, Seongnam-si (KR); Byeonghwa Kim, Incheon (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 237 days.

(21) Appl. No.: 17/894,287

(22) Filed: Aug. 24, 2022

(65) Prior Publication Data
US 2023/0219540 A1 Jul. 13, 2023

(30) Foreign Application Priority Data
Jan. 10, 2022 (KR) .................. 10-2022-0003259

(51) Int. Cl.
| | |
|---|---|
| *B60T 7/22* | (2006.01) |
| *B60Q 9/00* | (2006.01) |
| *G08G 1/052* | (2006.01) |
| *G08G 1/16* | (2006.01) |

(52) U.S. Cl.
CPC ................ *B60T 7/22* (2013.01); *B60Q 9/008* (2013.01); *G08G 1/052* (2013.01); *G08G 1/166* (2013.01)

(58) Field of Classification Search
CPC .......... B60T 7/22; B60Q 9/008; G08G 1/166; G08G 1/165; G08G 1/168; G08G 1/052; B60W 30/08; B60W 40/02; B60W 40/10; B60W 50/14; B60W 2420/403; B60W 2420/54; B60W 2554/40; B60W 2554/4029; B60W 2554/80; B60W 2554/20; B60W 2554/4042; B60W 2554/802
USPC .................................. 701/41, 42, 43, 44, 70
See application file for complete search history.

(56) References Cited

FOREIGN PATENT DOCUMENTS

| JP | 2004301567 | * | 10/2004 | ............ B60R 21/00 |
| JP | 3893912 | * | 3/2007 | ............ B60W 30/18 |
| JP | 4559626 | * | 10/2010 | ............ B60R 21/00 |
| JP | 2016053755 | * | 4/2016 | ............... B08G 1/16 |

* cited by examiner

*Primary Examiner* — Hai H Huynh
(74) *Attorney, Agent, or Firm* — Morgan, Lewis & Bockius LLP

(57) ABSTRACT

A vehicle control apparatus estimates a speed of a surrounding object of a vehicle using a relative speed of the surrounding object, and thus, it is possible to prevent malfunction of the ADAS function and collision of the vehicle with the surrounding object even when the speed of the surrounding object cannot be measured. The vehicle control apparatus controls the vehicle by distinguishing whether a position of the vehicle is a parking lot, and thus, it is possible to prevent the malfunction of the ADAS.

19 Claims, 7 Drawing Sheets

VEHICLE CONTROL APPARATUS AND METHOD

CROSS-REFERENCE TO RELATED APPLICATION

The present application claims priority to Korean Patent Application No. 10-2022-0003259, filed on Jan. 10, 2022, the entire contents of which is incorporated herein for all purposes by this reference.

TECHNICAL FIELD

The present disclosure relates to a vehicle control apparatus and a vehicle control method.

BACKGROUND

The content described here merely provides background information for the present disclosure and does not form the related art.

A vehicle is provided with an Advanced Driver Assistance System (ADAS). The vehicle utilizes the ADAS to analyze the driver's condition and surrounding circumstances, and performs such things as securing visibility, displaying a screen, guiding, warning, and controlling.

As functions of the ADAS, there are a Blind-spot Collision Avoidance (BCA) function, a Rear Cross-Traffic Collision Warning (RCCW) function, a Safe Exit Assist (SEA), a Parking Collision-avoidance Assist (PCA), a Remote Parking Pilot (RPP) function, and the like.

Conventionally, to accurately detect a collision risk between a moving surrounding object and a vehicle, a speed of the surrounding object is measured using a Light Detection and Ranging (LiDAR) detector or the like. When the speed of the surrounding object cannot be accurately measured, there is a problem that the ADAS function may malfunction or the vehicle may collide with the surrounding object.

In assisting vehicle control using the ADAS function, when the vehicle approaches other nearby vehicles even though the vehicle is driving on the road, not on a parking lot, the vehicle is recognized as being parked, and there is a problem in that the ADAS function malfunctions.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a vehicle control apparatus including: a sensing unit configured to use one or more detectors and one or more cameras to obtain information on a surrounding object of a vehicle; a collision risk determination unit configured to determine a collision risk between the vehicle and the surrounding object according to the obtained information; and a control unit configured to control the vehicle according to a result of the determining of the collision risk determination unit, wherein the collision risk determination unit includes a position determination module configured to determine whether a position of the vehicle is a parking lot according to the obtained information on the surrounding object of the vehicle, and a collision risk determination module configured to determine a collision risk between the vehicle and the surrounding object based on at least one of a collision prediction time between the vehicle and the surrounding object and a distance between the vehicle and the surrounding object, according to a result of the determining of the position determination module.

According to another aspect, the present disclosure provides a vehicle control method including: using one or more detectors and one or more cameras to obtain information on a surrounding object of a vehicle; determining whether a position of the vehicle is a parking lot according to the obtained information; determining a collision risk between the vehicle and the surrounding object based on at least one of a collision prediction time between the vehicle and the surrounding object and a distance between the vehicle and the surrounding object, according to a result of the determining whether the position of the vehicle is the parking lot; and controlling the vehicle based on a result of the determining the collision risk.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 4A and FIG. 413 are diagrams illustrating a principle of recognizing the surrounding object of the vehicle on a road, and determining the collision risk between the vehicle and the surrounding object, by the vehicle control apparatus according to an exemplary embodiment of the present disclosure.

Figure 1:
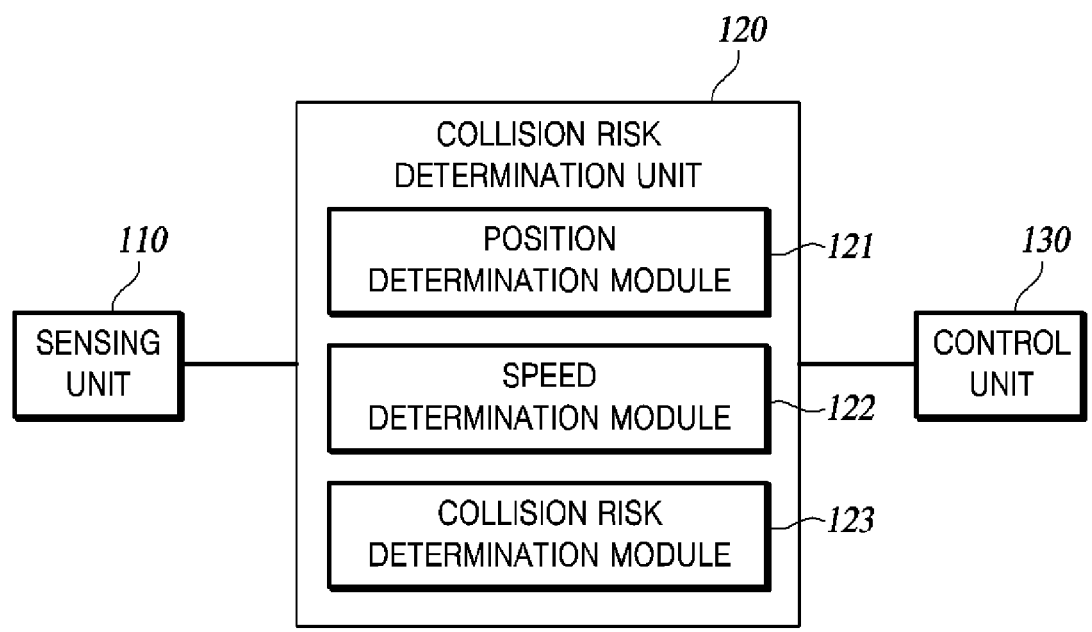
FIG. 1 is a block diagram of a vehicle control apparatus according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

A vehicle control apparatus according to an exemplary embodiment estimates a speed of a surrounding object of a vehicle using a relative speed of the surrounding object, and thus, it is possible to prevent malfunction of the ADAS function and collision of the vehicle with the surrounding object even when the speed of the surrounding object cannot be measured.

The vehicle control apparatus according to an exemplary embodiment controls the vehicle by distinguishing whether a position of the vehicle is a parking lot, and thus, it is possible to prevent the malfunction of the ADAS.

The problems to be solved by the present disclosure are not limited to the problems mentioned above, and other problems not mentioned will be clearly understood by those skilled in the art from the following description.

Hereinafter, some exemplary embodiments of the present disclosure will be described in detail with reference to the accompanying drawings. In the following description, like reference numerals preferably designate like elements, although the elements are shown in different drawings. Furthermore, in the following description of various exemplary embodiments of the present disclosure, a detailed description of known functions and configurations incorporated therein will be omitted for clarity and for brevity.

Additionally, various terms such as first, second, A, B, (a), (b), etc., are used solely to differentiate one component from the other but not to imply or suggest the substances, order, or sequence of the components. Throughout the present specification, when a part 'includes' or 'comprises' a component, the part is meant to further include other components, not to exclude thereof unless specifically stated to the contrary. The terms such as 'unit', 'module', and the like refer to one or more units for processing at least one function or operation, which may be implemented by hardware, software, or a combination thereof.

FIG. 1 is a block diagram of a vehicle control apparatus according to an exemplary embodiment of the present disclosure.

Figure 2:
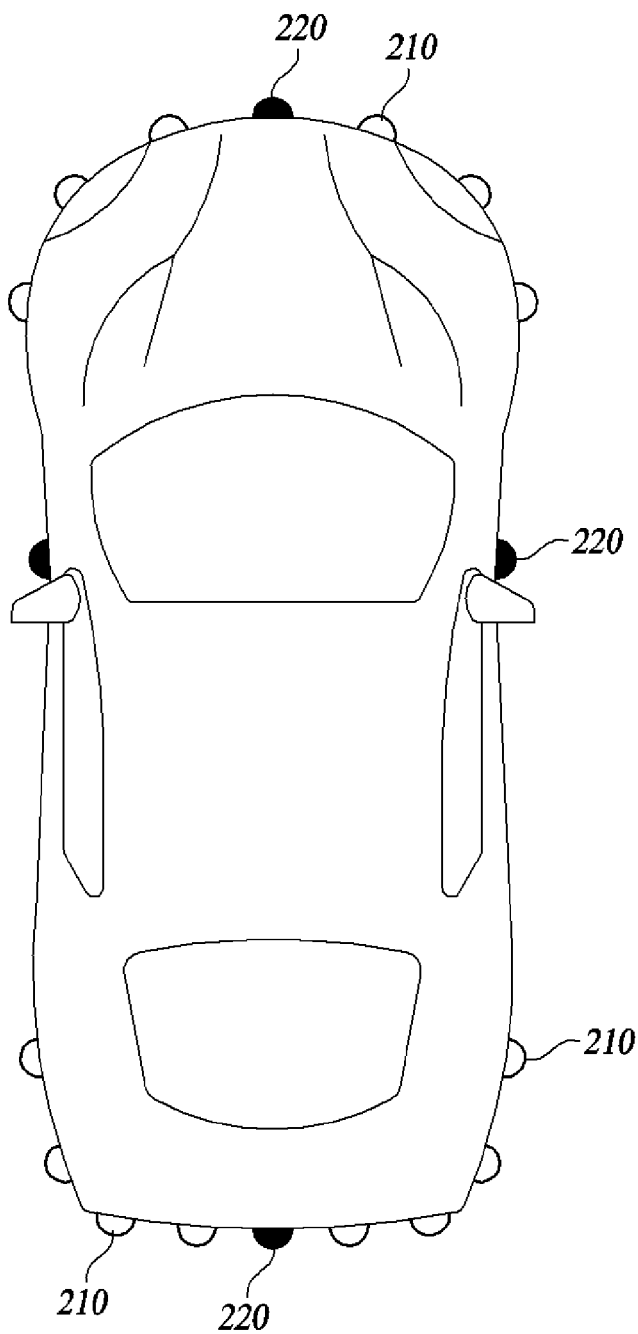
FIG. 2 is a diagram illustrating positions at which a detector and a camera are provided according to an exemplary embodiment of the present disclosure.

FIG. 2 is a diagram illustrating positions at which a detector and a camera are provided according to an exemplary embodiment of the present disclosure.

Referring to FIG. 1 and FIG. 2, a vehicle control apparatus 100 according to an exemplary embodiment of the present disclosure may include a sensing unit 110, a collision risk determination unit 120, and a control unit 130.

The sensing unit 110 may include a plurality of detectors 210 and a plurality of cameras 220.

The collision risk determination unit 120 may include a position determination module 121, a speed determination unit (speed determination module) 122, and a collision risk determination module 123. Here, the position determination module 121 determines a position of a vehicle, the speed determination unit 122 determines a speed of the surrounding object of the vehicle, and the collision risk determination module 123 determines the collision risk between the vehicle and the surrounding object.

The vehicle control apparatus 100 according to an exemplary embodiment of the present disclosure may be mounted on an autonomous vehicle and a general vehicle.

The sensing unit 110 obtains information on the surrounding object of the vehicle by use of the detectors 210 and the cameras 220. Here, the surrounding object of the vehicle may be a lane, a parking line, a vehicle stopper, a pillar, a pedestrian, and other vehicles. The information on the surrounding object of the vehicle may be a relative position of the surrounding object with respect to the vehicle (hereinafter, "relative position"), and include a distance between the vehicle and the surrounding object, and the type of the surrounding object. The sensing unit 110 may transmit the obtained information to the collision risk determination unit 120.

The detector 210 may be provided inside and/or outside the vehicle to surround the vehicle. The detector 210 may detect the surrounding object of the vehicle and obtain information on the distance between the vehicle and the surrounding object. The detector 210 may be an ultrasonic detector.

The cameras 220 may be provided on the front, rear, and both sides of the vehicle. The camera 220 may obtain information on the type of the surrounding object of the vehicle and the distance between the vehicle and the surrounding object. The camera 220 may be a wide-angle camera.

The collision risk determination unit 120 may receive information on the surrounding object of the vehicle from the sensing unit 110. The collision risk determination unit 120 determines the collision risk between the vehicle and the surrounding object based on the information on the surrounding object. The collision risk determination unit 120 may determine whether the position of the vehicle is a parking lot, the speed of the surrounding object, and the collision risk between the vehicle and the surrounding object. Based on the determination result of the collision risk determination unit 120, the control unit 130 controls the vehicle.

The position determination module 121 determines the position of the vehicle based on information the surrounding object of the vehicle obtained by the sensing unit 110. When the sensing unit 110 detects at least one of a parking line, a vehicle stopper, a pillar, a pedestrian, and another parked vehicle, the position determination module 121 may determine that the position of the vehicle is a parking lot. When the sensing unit 110 does not detect a parking line, a vehicle stopper, a pillar, a pedestrian, and other parked vehicles, detects the lane, or detects both the lane and the parking line, the position determination module 121 may determine the position of the vehicle is a road. Based on the determination result of the position determination module 121, the speed determination unit 122 may determine the speed of the surrounding object, and the collision risk determination module 123 may determine the collision risk between the vehicle and the surrounding object.

The speed determination unit 122 determines the speed of the surrounding object of the vehicle based on the determination result of the position determination module 121. The speed determination unit 122 determines the speed of the surrounding object when the position of the vehicle is not a parking lot. The speed determination unit 122 converts the relative position of the surrounding object into an absolute position, and estimates the speed of the surrounding object using the absolute position information. The speed determination unit 122 may determine whether the surrounding object is stationary based on the speed of the surrounding object. Hereinafter, when the speed determination unit 122 determines the speed of the moving surrounding object, the description will be made assuming that the surrounding object is another vehicle in motion, but is not necessarily limited thereto, and the surrounding object may be another object moving depending on the purpose and use.

The speed determination unit 122 may convert the relative position of the surrounding object into the absolute position based on the position of the vehicle, the relative position of the surrounding object, and the distance between the vehicle and the surrounding object.

$$\hat{x}_t^- = A\hat{x}_{t-1} \quad \text{[Equation 1]}$$

$$\left( \hat{x} = \begin{bmatrix} \varphi \\ x \\ y \\ v \\ \theta \end{bmatrix}, A = I_{5\times 5} + \begin{bmatrix} 0 & 0 & \cos\varphi\cos\theta & -v\cos\varphi\sin\theta & -v\cos\theta\sin\varphi \\ 0 & 0 & \cos\varphi\sin\theta & v\cos\varphi\sin\theta & -v\cos\varphi\sin\theta \\ 0 & 0 & 0 & 0 & 0 \\ 0 & 0 & \sin\varphi/\text{wheelbase} & 0 & v\cos\varphi/\text{wheelbase} \\ 0 & 0 & 0 & 0 & 0 \end{bmatrix} \Delta t \right)$$

$$\left( \hat{x}_0 = \begin{bmatrix} 0 \\ 0 \\ 0 \\ 0 \\ 0 \end{bmatrix} \right)$$

The speed determination unit 122 may predict a current state of the surrounding object using Equation 1. Here, the state of the surrounding object means a position, a speed, a heading angle, and a steering angle of the surrounding object. $\hat{x}$ denotes a state of the surrounding object, $\hat{x}_t^-$ denotes a predicted value of a current (t) state of the surrounding object, and $\hat{x}_{t-1}$ denotes an estimated value of a previous (t−1) state of the surrounding object. x, y, v, θ, φ, and $\Delta^t$ are an x-direction position, a y-direction position, a speed, a heading angle, a steering angle, and a time change of the surrounding object, respectively. wheelbase denotes a length of a straight line from a center of a front wheel of the vehicle to a center of a rear wheel, and $I_{S\times S}$ denotes 5×5 identity matrix. The speed determination unit 122 may determine the predicted value of the current state by use of the estimated value of the previous state of the surrounding object.

$$P_t^- = AP_{t-1}A^T + Q \quad \text{[Equation 2]}$$

$$\left( Q = w \begin{bmatrix} I_2 \frac{\Delta t^2}{3} & I_2 \frac{\partial 7t^2}{2} \\ I_2 \frac{\Delta t^2}{2} & I_2 \Delta t \end{bmatrix}, P_0 = I_{5\times 5} \right)$$

The speed determination unit 122 may determine the covariance of the predicted value of the current state by use of Equation 2. Here, the covariance refers to a degree to which the predicted value is uncertain. $P_t^-$ denotes the covariance of the predicted value of the current state, $P_{t-1}$ denotes the covariance of the estimated value of the previous state, and Q denotes uncertainty (hereinafter "system noise covariance") of the predicted value due to noise generated in a process of the speed determination unit (122) predicting the state of the surrounding object. w and $I_2$ denote a system noise variable and 2×2 identity matrix, respectively. The speed determination unit 122 may determine the covariance of the prediction value of the current state by use of the covariance of the estimated value of the previous state and the system noise covariance.

$$K_t = \left( P_t^- H^T (HP_t^- H^T + R)^{-1} \right) \quad \text{[Equation 3]}$$

$$\left( E = \mu \left( 1 + \left( \frac{d_t - d_0}{d_{ROI} - d_0} \right)^2 \right) \begin{bmatrix} 1 & 0 \\ 0 & 1 \end{bmatrix}, H = \begin{bmatrix} 1 & 0 & 0 & 0 & 0 \\ 0 & 1 & 0 & 0 & 0 \end{bmatrix} \right)$$

The speed determination unit 122 may determine a gain value of the current state using Equation 3. Here, the gain value refers to a degree to which the predicted value should be corrected according to the uncertainty (covariance, P) of the predicted value. $K_t$ denotes the gain value of the current state, and R denotes the uncertainty of the measurement value (hereinafter, "measurement noise covariance") due to noise generated in obtaining the information of the surrounding object. μ is a measurement noise variable. $d_t$, $d_O$, and $d_{ROI}$ denote a distance between the camera 220 and the surrounding object, a minimum error recognition distance, and a distance to a preset region of interest (ROI), respectively. The minimum error recognition distance means a distance at which the smallest error occurs when measuring the distance between the vehicle and the surrounding object. The speed determination unit 122 may determine the gain value of the current state by use of the covariance of the predicted value of the current state and the measured noise covariance.

$$\hat{x}_t = \hat{x}_t^- + K_t(z_t - H\hat{x}_t^-) \quad \text{[Equation 4]}$$

$$\left( z = \begin{bmatrix} x \\ y \end{bmatrix} \right)$$

$$P_t = (I - K_t H) P_t^- \quad \text{[Equation 5]}$$

The speed determination unit 122 may determine the estimated value and the covariance of the current state by correcting the predicted value and the covariance of the current state using Equations 4 and 5. Here, $\hat{x}_t$ denotes the estimated value of the current state, and $P_t$ denotes the covariance of the estimated value of the current state. z denotes a position measurement value of the surrounding object. The speed determination unit 122 may determine the estimated value and the covariance of the current state by correcting the predicted value and the covariance of the current state using the gain value of the current state.

The speed determination unit 122 determines the predicted value of the current state using the initial state value of the surrounding object and the estimated value of the previous state, and determines the covariance of the predicted value of the current state using the estimated value of the previous state and the system noise covariance. The speed determination unit 122 may determine the gain value of the current state using the covariance of the predicted value of the current state and the measured noise covariance, and determine the estimated value and the covariance of the current state by correcting the predicted value and the covariance of the current state using the gain value of the current state. As a result, the speed determination unit 122 may estimate the speed of the surrounding object relatively accurately using only the position information of the surrounding object. Even when the vehicle control apparatus 100 according to an exemplary embodiment of the present disclosure cannot measure the speed of the surrounding object, it is possible to estimate the speed of the surrounding object to prevent a malfunction of the ADAS and the collision between the vehicle and the surrounding object.

The speed determination unit 122 may determine whether the surrounding object is stationary by use of the speed of the surrounding object. When the speed of the surrounding object is maintained at a stationary determination reference speed or less than the stationary determination reference speed for a stationary determination reference time, the speed determination unit 122 may determine that the surrounding object is stationary. When the speed of the surrounding object exceeds the stationary determination reference speed or is not maintained at the stationary determination reference speed or less the the stationary determination reference speed for the stationary determination reference time, the speed determination unit 122 may determine that the surrounding object is not stationary. Here, the stationary determination reference speed and the stationary determination reference time may be arbitrary values preset to determine whether the surrounding object is stationary.

The collision risk determination module 123 determines the collision risk of the vehicle and surrounding object based on the determination results of the position determination module 121 and/or the speed determination unit 122.

When the position of the vehicle is a parking lot, the collision risk determination module 123 compares the collision prediction time of the surrounding object of the vehicle with a preset time. When the collision prediction time is the preset time or less, the collision risk determination module 123 determines that there is the collision risk between the vehicle and surrounding objects.

When the position of the vehicle is not a parking lot and the surrounding object is stationary, the collision risk determination module 123 compares the collision prediction time with the preset time. When the collision prediction time is the preset time or less, the collision risk determination module 123 determines that there is the collision risk between the vehicle and the surrounding object. Here, the collision risk determination module 123 may determine the collision prediction time by use of a vehicle speed, a vehicle acceleration, a turning radius of the vehicle, and position information of the surrounding object.

When the position of the vehicle is not the parking lot and the surrounding object is not stationary, the collision risk determination module 123 compares the distance between the vehicle and the surrounding object with the preset distance. When the distance between the vehicle and the surrounding object is the preset distance or less, the collision risk determination module 123 determines that there is the collision risk.

The control unit 130 controls the vehicle based on the determination result of the collision risk determination unit 120. When the collision risk determination module 123 determines that there is the collision risk between the vehicle and the surrounding object, the control unit 130 provides a collision warning to the occupants of the vehicle and applies emergency braking to the vehicle.

The vehicle control apparatus 100 according to an exemplary embodiment of the present disclosure controls the vehicle by distinguishing whether the position of the vehicle is the parking lot and whether the surrounding object is stationary, and thus, it is possible to effectively prevent the malfunction of the ADAS function and the collision between the vehicle and the surrounding object.

Figure 3A:
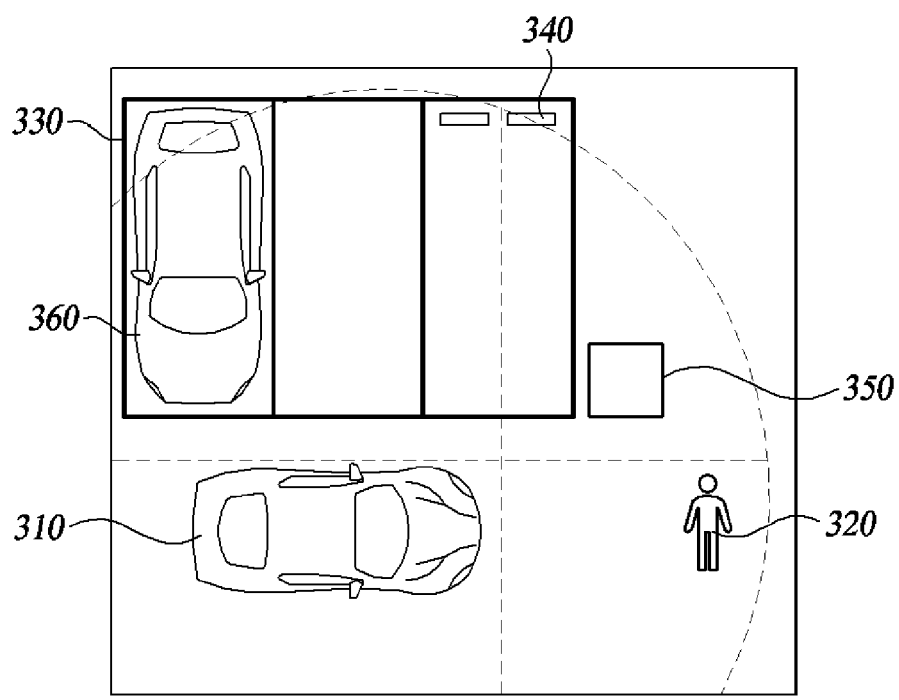
FIG. 3A and FIG. 3B are diagrams illustrating a principle of recognizing a surrounding object of the vehicle in a parking lot, and determining a collision risk between the vehicle and the surrounding object, by the vehicle control apparatus according to an exemplary embodiment of the present disclosure.
Figure 3B:
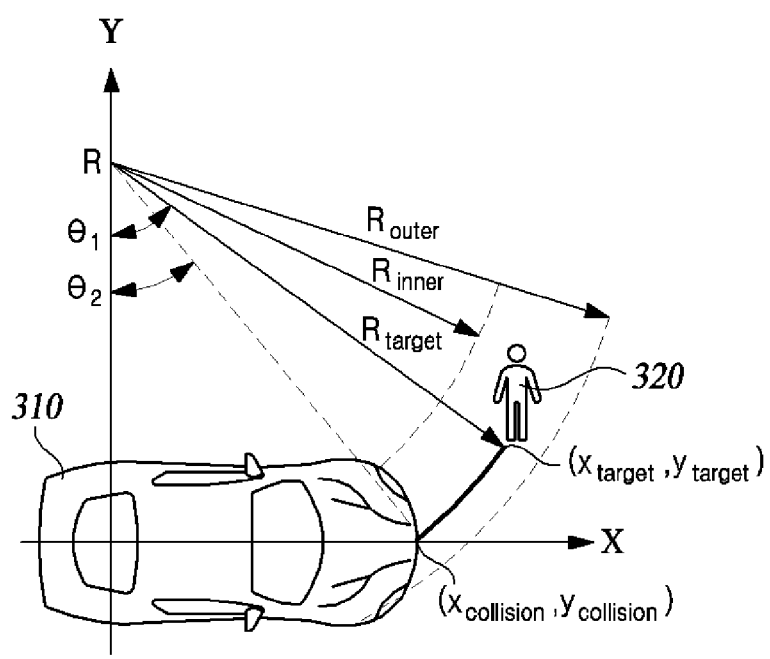

FIG. 3A and FIG. 3B are diagrams illustrating a principle of recognizing the surrounding object of the vehicle in the parking lot, and determining the collision risk between the vehicle and the surrounding object, by the vehicle control apparatus according to an exemplary embodiment of the present disclosure.

Referring to FIG. 3A and FIG. 3B, the vehicle control apparatus 100 according to an exemplary embodiment of the present disclosure may detect at least one of a pedestrian 320, a parking line 330, a vehicle stopper 340, a pillar 350, and other parked vehicles 360 around a vehicle 310 to determine whether the position of the vehicle 310 is the parking lot.

When the position of the vehicle 310 is the parking lot, the vehicle control apparatus 100 determines a collision prediction time of the vehicle 310 and the surrounding object, for example, the pedestrian 320. When the collision prediction time is the preset time or less, the vehicle control apparatus 100 determines that there is a collision risk between the vehicle 310 and the pedestrian 320 and brakes the vehicle 310. The vehicle control apparatus 100 may recognize a collision risk as a target to be determined in the case of $R_{inner} < R_{target}$ and $R_{target} < R_{outer}$.

$$\text{collision prediction time} = \frac{R_{target} \times (\theta_1 - \theta_2)}{\text{vehicle speed}} \quad \text{[Equation 6]}$$

$$\left( \theta_1 = \mathrm{atan2}(x_{target}, R - y_{target}), \right.$$

$$\left. \theta_2 = \mathrm{atan2}\left(x_{collision}, \sqrt{(R_{target})^2 - (x_{collision})^2}\right) \right)$$

The vehicle control apparatus 100 may determine the collision prediction time of the vehicle 310 and the pedestrian 320 using Equation 6.

Figure 4A:
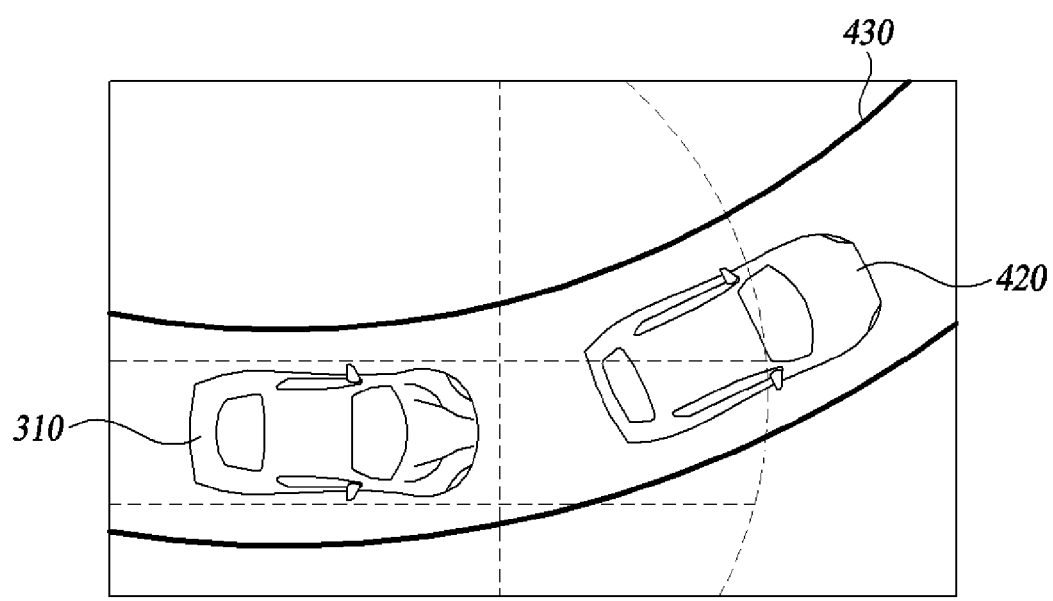
Figure 4B:
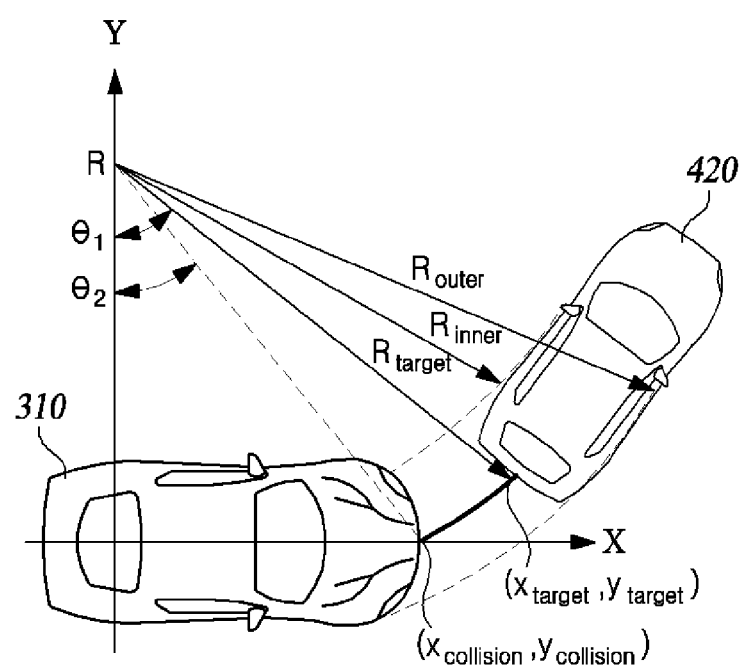

FIG. 4A and FIG. 4B are diagrams illustrating a principle of recognizing the surrounding object of the vehicle on a road, and determining the collision risk between the vehicle and the surrounding object, by the vehicle control apparatus according to an exemplary embodiment of the present disclosure.

Referring to FIG. 4A and FIG. 4B, the vehicle control apparatus 100 may determine whether the position of the vehicle 310 is a road by detecting another vehicle 420 being driven and the lane 430. When the position of the vehicle 310 is in the road and another vehicle 420 is not stationary, the vehicle control apparatus 100 compares the distance between the vehicle 310 and another vehicle 420 with a preset distance. When the distance between the vehicle 310 and another vehicle 420 is the preset distance or less, the vehicle control apparatus 100 determines that there is a risk of collision between the vehicle 310 and another vehicle 420 and brakes the vehicle 310.

When the position of the vehicle 310 is in a road and the other vehicle 420 is stationary, the vehicle control apparatus 100 determines the collision prediction time between the vehicle 310 and another vehicle 420, and compares the collision prediction time with a preset time. When the collision prediction time is the preset time or less, the vehicle control apparatus 100 determines that there is the collision risk between the vehicle 310 and another vehicle 420 and brakes the vehicle 310.

The vehicle control apparatus 100 may recognize the collision risk as an object to be determined in the case $R_{inner} < R_{target}$ of $R_{target} < R_{outer}$ and may determine the collision prediction time using Equation 6.

Figure 5:
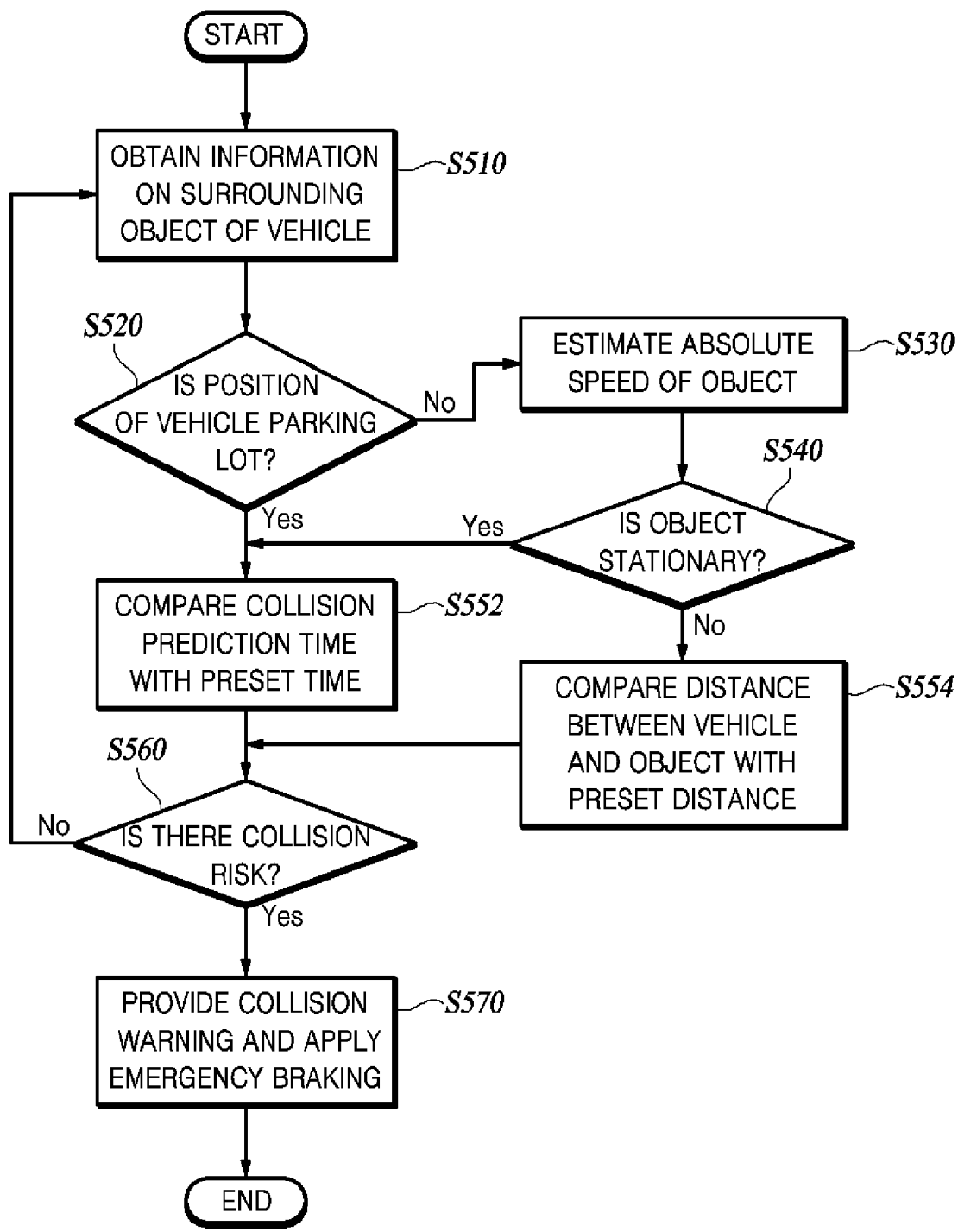
FIG. 5 is a flowchart of a vehicle control method according to an exemplary embodiment of the present disclosure.

FIG. 5 is a flowchart of a vehicle control method according to an exemplary embodiment of the present disclosure.

A method of controlling a vehicle according to an exemplary embodiment of the present disclosure will be described with reference to FIG. 5.

The sensing unit obtains information on the surrounding object of the vehicle (S510). The sensing unit 110 may obtain information on the type of the surrounding object of the vehicle, the distance between the vehicle and the surrounding object, the relative position of the surrounding object, or the like.

The position determination module is configured to determine whether the position of the vehicle is the parking lot (S520). The position determination module 121 may determine whether the position of the vehicle is in the parking lot based on the information on the surrounding object of the vehicle obtained by the sensing unit 110. The position determination module 121 may determine whether the position of the vehicle is in the parking lot based on information one a lane, a parking line, a vehicle stopper, a pillar, a pedestrian, and other vehicles.

When the position of the vehicle is not in the parking lot, the speed determination unit is configured to estimate the speed of the surrounding object (S530). The speed determination unit 122 converts the information on the relative position of the surrounding object into the absolute position, and estimates the speed of the surrounding object based on the absolute position information.

The speed determination unit determines whether the surrounding object is stationary (S540). The speed determination unit 122 determines whether the surrounding object is stationary by use of the estimated value of the speed of the surrounding object. When the speed of the surrounding object is maintained at the stationary determination reference speed or less for the stationary determination reference time, the speed determination unit 122 determines that the surrounding object is stationary. When the speed of the surrounding object exceeds the stationary determination reference speed or is not maintained at the stationary determination reference speed or less than the stationary determination reference speed for the stationary determination reference time, the speed determination unit 122 determines that the surrounding object is not stationary.

The collision risk determination module is configured to compare the collision prediction time with the preset time (S552). When the position of the vehicle is in the parking lot, or the position of the vehicle is not in the parking lot and the surrounding object is stationary, the collision risk determination module 123 determines the collision prediction time of the vehicle and the surrounding object. The collision risk determination module 123 may determine the collision prediction time by use of the vehicle speed, the vehicle acceleration, the turning radius of the vehicle, and the position of surrounding object.

The collision risk determination module is configured to compare the distance between the vehicle and the surrounding object with a preset distance (S554). When the position of the vehicle is not the parking lot and the surrounding object of the vehicle is not stationary, the collision risk determination module 123 compares the distance between the vehicle and the surrounding object with the preset distance to determine the collision risk between the vehicle and the surrounding object.

The collision risk determination module determines whether there is the collision risk between the vehicle and the surrounding object (S560). The collision risk determination module 123 determines that there is the collision risk between the vehicle and the surrounding object when the collision prediction time is the preset time or less. The collision risk determination module 123 determines that there is the collision risk between the vehicle and the surrounding object when the distance between the vehicle and the surrounding object is the preset distance or less.

When the collision risk determination module determines that there is the collision risk between the vehicle and the surrounding object, the control unit is configured to provide the collision warning to the occupant of the vehicle and applies emergency braking to the vehicle (S570).

According to an exemplary embodiment of the present disclosure, the vehicle control apparatus estimates the speed of the vehicle using a relative position of the surrounding object of the vehicle, and thus, it is possible to prevent malfunction of the ADAS function and collision of the vehicle with the surrounding object even when the speed of the surrounding object cannot be measured.

According to an exemplary embodiment of the present disclosure, the vehicle control apparatus controls the vehicle by distinguishing whether a position of the vehicle is a parking lot, and thus, it is possible to prevent the malfunction of the ADAS.

Although it is described that the processes are sequentially executed in the flowchart of the present disclosure, this is merely illustrative of the technical idea of various exemplary embodiments of the present disclosure. In other words, those of ordinary skill in the art to which various exemplary embodiments of the present disclosure pertain may change and execute the processes described in the flowchart without departing from the essential characteristics of various exemplary embodiments of the present disclosure, or execute one or more processes in parallel to apply various modifications and variations, and thus, the flowchart is not limited to a time-series order.

Various implementations of the systems and techniques described herein may be implemented in a digital electronic circuit, an integrated circuitry, a field programmable gate array (FPGA), an application specific integrated circuit (ASIC), a computer hardware, firmware, software, and/or combination thereof. These various implementations may include being implemented in one or more computer programs executable on a programmable system. The programmable system includes at least one programmable processor (which may be a special purpose processor or may be a general-purpose processor) coupled to receive data and instructions from, and transmit data and instructions to, a storage system, at least one input device, and at least one output device. Computer programs (also known as programs, software, software applications or code) include instructions for a programmable processor and are stored on a "computer-readable medium".

The computer-readable recording medium includes all types of recording devices in which data readable by a computer system is stored. These computer-readable recording media may be a non-volatile or non-transitory medium, such as a ROM, a CD-ROM, a magnetic tape, a floppy disk, a memory card, a hard disk, a magneto-optical disk, and a storage device, and may further include a transitory medium such as a data transmission medium. Furthermore, the computer-readable recording medium may be distributed in a network-connected computer system, and the computer-readable code may be stored and executed in a distributed manner.

Various implementations of the systems and techniques described herein may be implemented by a programmable computer. Here, the computer includes a programmable processor, a data storage system (including volatile memory, non-volatile memory, other types of storage systems, or combinations thereof) and at least one communication interface. For example, a programmable computer may be one of a server, a network appliance, a set-top box, an embedded device, a computer expansion module, a personal computer, a laptop, a Personal Data Assistant (PDA), a cloud computing system, and a mobile device.

In various exemplary embodiments of the present disclosure, each operation described above may be performed by a control device, and the control device may be configured by multiple control devices, or an integrated single control device.

In various exemplary embodiments of the present disclosure, the control device may be implemented in a form of hardware or software, or may be implemented in a combination of hardware and software.

Furthermore, the terms such as "unit", "module", etc. Included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle control apparatus comprising:
    a sensing unit configured to use one or more detectors and one or more cameras to obtain information on a surrounding object of a vehicle;
    a collision risk determination unit configured to determine a collision risk between the vehicle and the surrounding object according to the obtained information; and
    a control unit configured to control the vehicle according to a result of the determining of the collision risk determination unit,
    wherein the collision risk determination unit includes:
        a position determination module configured to determine whether a position of the vehicle is in a parking lot according to the obtained information on the surrounding object of the vehicle,
        a speed determination module configured to estimate an absolute speed of the surrounding object based on information of the surrounding object, and
        a collision risk determination module configured to determine a collision risk between the vehicle and the surrounding object based on at least one of a collision prediction time between the vehicle and the surrounding object and a distance between the vehicle and the surrounding object, according to a result of the determining of the position determination module and a result of the estimating of the absolute speed of the surrounding object of the speed determination module,
    wherein when the position of the vehicle is not in the parking lot, the speed determination module is configured to estimate the absolute speed of the surrounding object, and
    wherein when the position of the vehicle is in the parking lot, the collision risk determination module is configured to compare the collision prediction time with a preset time to determine the collision risk between the vehicle and the surrounding object without estimating the absolute speed of the surrounding object.

2. The vehicle control apparatus of claim 1,
    wherein the collision risk determination unit further includes a speed determination module configured to estimate a speed of the surrounding object based on the obtained information on the surrounding object, and
    wherein the speed determination unit is further configured to estimate the speed of the surrounding object when the position of the vehicle is not in the parking lot.

3. The vehicle control apparatus of claim 2,
    wherein the sensing unit obtains relative position information of the surrounding object based on the vehicle, and
    wherein the speed determination unit is further configured to estimate the speed of the surrounding object based on the relative position information.

4. The vehicle control apparatus of claim 3,
    wherein the speed determination unit is further configured to convert the relative position information into absolute position information of the surrounding object and configured to estimate the speed of the surrounding object using the absolute position information.

5. The vehicle control apparatus of claim 2,
    wherein the speed determination unit is further configured to determine whether the surrounding object is stationary based on the speed of the surrounding object, and
    wherein the collision risk determination module is further configured to compare the collision prediction time with a preset time to determine the collision risk between the vehicle and the surrounding object when the surrounding object is stationary.

6. The vehicle control apparatus of claim 5,
    wherein the speed determination unit is further configured to determine that the surrounding object is stationary when the speed of the surrounding object is maintained at a stationary determination reference speed or less than the stationary determination reference speed for a stationary determination reference time.

7. The vehicle control apparatus of claim 2,
    wherein the speed determination unit is further configured to determine whether the surrounding object is stationary based on the speed of the surrounding object, and wherein the collision risk determination module is further configured to compare the distance between the vehicle and the surrounding object with a preset time to determine the collision risk when the surrounding object is not stationary.

8. The vehicle control apparatus of claim 7, wherein the speed determination unit is further configured to determine that the surrounding object is not stationary when the speed of the surrounding object exceeds a stationary determination reference speed or the speed of the surrounding object is not maintained at the stationary determination reference speed or less than the stationary determination reference speed for a stationary determination reference time.

9. The vehicle control apparatus of claim 1,
wherein when the position of the vehicle is in the parking lot, the collision risk determination module is configured to compare the collision prediction time with a preset time to determine the collision risk between the vehicle and the surrounding object.

10. The vehicle control apparatus of claim 1, wherein the control unit is configured to provide a collision warning to an occupant of the vehicle and is configured to apply emergency braking to the vehicle when the collision risk determination unit concludes that there is the collision risk between the vehicle and the surrounding object.

11. The vehicle control apparatus of claim 1, wherein the position determination module is configured to determine whether the position of the vehicle is in the parking lot based on information on at least one of a lane, a parking line, a vehicle stopper, a pillar, a pedestrian, and another vehicle around the vehicle.

12. A vehicle control method comprising:
using, by a processor, one or more detectors and one or more cameras to obtain information on a surrounding object of a vehicle;
determining, by the processor, whether a position of the vehicle is in a parking lot according to the obtained information;
estimating, by the processor, an absolute speed of the surrounding object based on information of the surrounding object when the position of the vehicle is not in the parking lot;
determining, by the processor, a collision risk between the vehicle and the surrounding object based on at least one of a collision prediction time between the vehicle and the surrounding object and a distance between the vehicle and the surrounding object, according to a result of the determining whether the position of the vehicle is in the parking lot and a result of the estimating of the absolute speed of the surrounding object of the speed determination module; and
controlling, by the processor, the vehicle based on a result of the determining the collision risk,
wherein the determining of the collision risk includes comparing the collision prediction time with a preset time to determine the collision risk between the vehicle and the surrounding object without estimating the absolute speed of the surrounding object when the position of the vehicle is in the parking lot.

13. The vehicle control method of claim 12, wherein the estimating of the absolute speed of the surrounding object includes converting relative position information of the surrounding object into absolute position information of the surrounding object and estimating the absolute speed of the surrounding object using the absolute position information.

14. The vehicle control method of claim 12, wherein the determining of the collision risk includes:
comparing the collision prediction time with a preset time to determine the collision risk when the surrounding object is stationary based on the absolute speed of the surrounding object.

15. The vehicle control method of claim 14, wherein the surrounding object is determined to be stationary when the absolute speed of the surrounding object is maintained at a stationary determination reference speed or less than the stationary determination reference speed for a stationary determination reference time.

16. The vehicle control method of claim 12, wherein the determining of the collision risk includes:
comparing the distance between the vehicle and the surrounding object with the preset time to determine the collision risk when the surrounding object is not stationary.

17. The vehicle control method of claim 16, wherein the surrounding object is determined not to be stationary when the absolute speed of the surrounding object exceeds a stationary determination reference speed or the absolute speed of the surrounding object is not maintained at the stationary determination reference speed or less than the stationary determination reference speed for a stationary determination reference time.

18. The vehicle control method of claim 12, wherein the determining of whether the position of the vehicle is in the parking lot includes:
determining whether the position of the vehicle is in the parking lot based on information on at least one of a lane, a parking line, a vehicle stopper, a pillar, a pedestrian, and another vehicle around the vehicle.

19. A non-transitory computer readable storage medium on which a program for performing the vehicle control method of claim 12 is recorded.

* * * * *